United States Patent Office 3,296,781
Patented Jan. 10, 1967

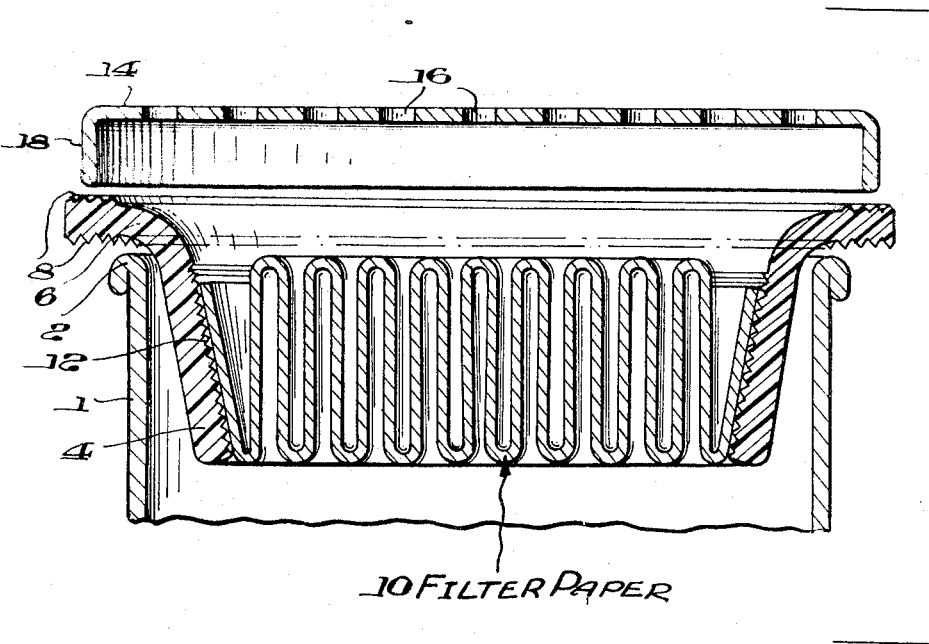

3,296,781
FILTER
Helmut F. Schumann, Berlin, Germany, assignor to Auergesellschaft G.m.b.H., Berlin, Germany, a corporation of Germany
Filed Nov. 10, 1964, Ser. No. 410,174
2 Claims. (Cl. 55—497)

This invention relates to filter for removing suspended material from a fluid, and more particularly to such a filter having improved means for mounting and sealing a filter media in a housing.

It is an object of this invention to provide a filter of simple, economical construction that can be simply and easily removeably sealed to a filter housing. Another object is to provide an economical housed filter having a high efficiency seal between the filter media and the housing. Other objects will be apparent from the following description and claims.

In accordance with this invention, a filter media is secured to a filter holder formed of flexible resilient material having an integral outwardly extending flange. The filter holder fits within a housing and the flange extends outwardly over the end of the housing. A cap member is adapted to engage the flange and bend it downwardly along the housing and seal the flange against the cap and the wall of the housing. The cap is firmly held in place by frictional engagement of the flange, and it can be readily manually removed for replacement of the filter holder.

The drawing shows an exploded sectional view of a preferred embodiment of the filter of this invention.

Referring to FIG. 1, tubular housing 1, preferably having a flanged or rolled edge 2, is formed of rigid metal or plastic. The housing may be in the form of a cartridge for connection to a respirator or the like, in which case it may be formed with integral means for connecting it to a cartridge receiver. The tubular filter holder 4 is made of a flexible resilient material such as, for example, rubber, polyethylene, vinyl chloride polymers, vinyl chloride-vinyl acetate copolymers, and other thermoplastic synthetic polymers. The filter holder has an integral outwardly extending flange portion 6, the marginal portion of which has a plurality of circumferentially spaced grooves 8 that form a plurality of sealing edges. The filter media 10 is a corrugated filter paper having concentric corrugations, although it should be recognized that other types of self-supporting filter media may be used. The entire edge of the filter media is sealed to the holder by adhesive; preferably the inner wall of the filter holder has a plurality of circumferential grooves 12 for better distribution and adherence of the adhesive. The rigid cap 14 having perforations 16 and a depending sidewall 18 is sized to tightly engage the flange between the cap sidewall and the housing sidewall, forming a seal that prevents leakage by-passing the filter media. In assembly, the cap bends the outer flange portion downwardly along the housing sidewall and is removably held in position by frictional engagement with the flange.

Because of the simplicity of disassembly and assembly, a filter insert consisting of the filter holder and filter media can be used as a field replacement unit in various devices, such as respirators.

According to the provisions of the patent statutes, I have explained the principle and mode of practicing my invention and have described what I now consider to represent its best embodiment. However, I desire to have it understood that, within the scope of the appended claims, the invention may be practiced otherwise than as specifically described.

I claim:
1. A filter comprising a tubular housing having a sidewall and an open end, a filter holder of flexible, resilient, solid, polymeric material having a tubular portion within said housing and an integral flange portion extending outwardly over said end and downwardly along said sidewall, each surface of said flange portion having a plurality of circumferential grooves, a self-supporting corrugated filter media adhesively sealed to said tubular portion, a perforated cap having a sidewall surrounding said flange and holding said flange in sealing frictional engagement against said housing and said cap, said cap being removeably secured to said housing solely by said frictional engagement.
2. A filter in accordance with claim 1 in which the inner surface of said tubular portion has a plurality of spaced circumferential grooves and said filter media is sealed to said grooved surface.

References Cited by the Examiner
UNITED STATES PATENTS

| | | | |
|---|---|---|---|
| 2,034,373 | 3/1936 | Bilde | 55—502 X |
| 2,199,230 | 4/1940 | Schwartz. | |
| 2,378,929 | 6/1945 | Joyce | 55—505 X |
| 2,395,298 | 2/1946 | Shock | 55—502 X |
| 2,755,883 | 7/1956 | Brace | 55—373 |

FOREIGN PATENTS

| | | |
|---|---|---|
| 509,582 | 7/1939 | Great Britain. |
| 879,781 | 10/1961 | Great Britain. |

OTHER REFERENCES

German printed application No. 1,134,290, August 1962.

ROBERT F. BURNETT, *Primary Examiner.*